United States Patent [19]

Shibayama

[11] Patent Number: 4,929,069
[45] Date of Patent: May 29, 1990

[54] ZOOM LENS
[75] Inventor: Atsushi Shibayama, Kawasaki, Japan
[73] Assignee: Nikon Corporation, Tokyo, Japan
[21] Appl. No.: 403,173
[22] Filed: Sep. 5, 1989
[30] Foreign Application Priority Data Sep. 9, 1988 [JP] Japan .............................. 63-225959

[51] Int. Cl.⁵ .............................................. G02B 15/14
[52] U.S. Cl. ..................................... 350/423; 350/427
[58] Field of Search ........................ 350/423, 426, 427

[56] References Cited

U.S. PATENT DOCUMENTS

| | | | |
|---|---|---|---|
| 4,659,186 | 4/1987 | Sato et al. | 350/423 |
| 4,679,913 | 7/1987 | Sato et al. | 350/423 |
| 4,682,860 | 7/1987 | Tanaka et al. | 350/423 |
| 4,720,179 | 1/1988 | Ito | 350/423 |
| 4,772,106 | 9/1988 | Ogata et al. | 350/427 |
| 4,818,081 | 4/1989 | Ito | 350/426 |
| 4,836,660 | 6/1989 | Ito | 350/423 |
| 4,838,669 | 6/1989 | Ogata et al. | 350/427 |
| 4,854,683 | 8/1989 | Ozawa | 350/427 |

FOREIGN PATENT DOCUMENTS 62-56917 3/1987 Japan .
62-284319 12/1987 Japan .

Primary Examiner—Scott J. Sugarman
Attorney, Agent, or Firm—Shapiro and Shapiro

[57] ABSTRACT

A compact zoom lens provided with a first lens group of a positive refractive power and second lens group of a negative refractive power. The zooming operation can be achieved by varying the air gap between the lens groups. The first lens group comprises, in the order from the object side, a positive meniscus lens component with faces convex to the object side, a biconcave lens component, a biconvex lens component, and a positive lens component. The second lens group comprises, in the order from the object side, a positive meniscus lens component with faces convex to the image side, and a negative meniscus lens component with faces concave to the object side. The zoom lens has a zoom ratio of 1.6 or higher.

15 Claims, 5 Drawing Sheets

ZOOM LENS

BACKGROUND OF THE INVENTION

1. Field of the Invention

The present invention relates to a zoom lens adapted for use in a compact camera.

2. Related Background Art

Zoom lenses are recently employed even in compact cameras with lens shutters, and the zoom lens adapted for such use is disclosed for example in the U.S. Pat. No. 4,720,179.

However the zoom lens disclosed in said patent has as many as eight components and is difficult to supply inexpensively to the users.

For this reason, zoom lenses with fewer components are disclosed for example in the Japanese Laid-open Patents Sho 62-56917 and Sho 62-284319, and the U.S. Pat. Nos. 4,772,106 and 4,682,860.

Among these, the Japanese Laid-open Patent Sho 62-56917 proposes the use of an aspherical lens while the Japanese Laid-open Patent Sho 62-284319 proposes the use of a gradient-index lens, but the use of such elements is undesirable because such elements are more expensive than the ordinary spherical lenses.

Also, the U.S. Pat. Nos. 4,772,106 and 4,682,860 provide zoom lenses with 5 to 7 elements, but the zoom ratio of these zoom lenses is limited to 1.5 times.

SUMMARY OF THE INVENTION

In consideration of the foregoing, the object of the present invention is to provide an inexpensive zoom lens of high performance, which is compact in shape with about six components, and still has a zoom ratio of 1.6 times or higher.

The foregoing object can be attained, according to the present invention, by a zoom lens provided with a first lens group G1 of a positive refractive power and a second lens group G2 of a negative refractive power, satisfying following conditions (a) to (c), and adapted to achieve zooming function by varying the air gap between said lens groups, wherein (a) said first lens group G1 comprises a positive meniscus lens component L11 with a convex face directed to the object side, a biconcave lens component L12, a biconvex lens component L13, and a positive lens component L14; (b) said second lens group G2 comprises a positive meniscus lens component L21 with a convex face directed to the image side, and a negative meniscus lens component L22 with a concave face directed to the object side; and (c) the above-mentioned lens components satisfy following five conditions:

$$0.49 < K/f_w < 0.7 \tag{1}$$

$$-12 < \frac{r_b + r_a}{r_b - r_a} < -3.4 \tag{2}$$

$$0.075 < D_{21}/f_w < 0.170 \tag{3}$$

$$1.25 < \frac{r_d + r_c}{r_d - r_c} < 1.80 \tag{4}$$

$$-0.13 < n_{21} - n_{22} < 0.06 \tag{5}$$

wherein:
K: $d_{12} \cdot n_{12} + d_{13} \cdot n_{13} + d_{14} \cdot n_{14} + D_{12} + D_{13}$
$d_{12}$: axial thickness of biconcave lens component L12;
$d_{13}$: axial thickness of biconvex lens component L13;
$d_{14}$: axial thickness of positive lens component L14;
$n_{12}$: refractive index of biconcave lens component L12;
$n_{13}$: refractive index of biconvex lens component L13;
$n_{14}$: refractive index of positive lens component L14;
$D_{12}$: axial air gap between biconcave lens component L12 and biconvex lens component L13;
$D_{13}$: axial air gap between the biconvex lens component L13 and positive lens component L14;
$f_w$: focal length of the entire system at the widest angle side;
$r_a$: radius of curvature of a face, closest to the object side, of the positive meniscus lens component L21 in the second lens group;
$r_b$: radius of curvature of a face, closest to the image side, of the positive meniscus lens component L21 in the second lens group;
$D_{21}$: axial air gap between the positive meniscus lens component l21 and the negative meniscus lens component L22 in the second lens group;
$r_c$: radius of curvature of a face, closest to the object side, of the negative meniscus lens component L22 in the second lens group;
$r_d$: radius of curvature of a face, closest to the image side, of the negative meniscus lens component L22 in the second lens group;
$n_{21}$: refractive index of the positive meniscus lens component L21 in the second lens group; and
$n_{22}$: refractive index of the negative meniscus lens component L22 in the second lens group.

The specific features of the present invention is as follows.

In a two-group zoom lens with positive and negative groups, there generally increases the positive distortion aberration at the wide angle side if the zoom ratio is extended in the wide angle side. Also a positive distortion aberration tends to appear in the second lens group if the second lens group G2 is composed of as little as two lenses, as in the zoom lens of the present invention. In order to correct such distortion aberration, a negative distortion aberration has to be generated in the first lens group G1.

For this purpose, it is effective to suitably shape the lens components distant from the diaphragm and generating particularly large distortion aberrations namely the positive lens component L11 closest to the object and the negative lens component L12 positioned second, of the first lens group.

In the zoom lens of the present invention, therefore, the positive lens component L11 positioned closest to the object in the first lens group is composed of a meniscus shape with a convex face directed toward the object side, in order to minimize the positive distortion aberration generated by converging function of said component.

Also the negative lens component L12 positioned second from the object side in the first lens group is the only origin of the negative distortion aberration, by the diverging function. For effectively generating said negative distortion aberration, said negative lens component L12 has a biconcave form, thereby increasing the incident angle of the off-axis oblique ray at the face at the object side of said lens component, and decreasing the emergent angle of the off-axis oblique ray at the face at the image side.

Thus the zoom lens of the present invention generates a negative distortion aberration in the first lens group G1 and can extremely effectively compensate the positive distortion aberration generated in the second lens group G2.

As explained above, the second lens group G2 of negative refractive power generates a positive distortion aberration. In order to minimize said positive distortion aberration thereby facilitating the correction thereof, the negative lens component L22 in said lens group has a meniscus form with a concave face directed to the object side.

As explained above, the zoom lens of the present invention has a structure advantageous for the correction of the distortion aberration.

Also the zoom lens of the present invention tends to generate a positive spherical aberration due to the negative refractive power of the second lens group G2, and said spherical aberration tends to increase in the positive direction when the zooming operation is conducted from the wide angle side to the telephoto side. Thus, in order to prevent the variation in spherical aberration resulting from zooming, it is necessary to intentionally generate a negative spherical aberration in the positive lens component L21 positioned at the object side in the second lens group G2, thereby satisfactorily correct the spherical aberration within said second lens group G2.

A biconvex positive lens component L21 cannot fully correct the positive spherical aberration generated in the negative meniscus lens component L22. In the zoom lens of the present invention, therefore, said positive lens component L21 is given a meniscus form iwth a convex face directed to the image side, thereby generating a larger negative spherical aberration and satisfactorily correcting the variation in the spherical aberration resulting from zooming operation. Besides, if a diaphragm is provided in the space between the first and second lens group, the structure is advantageous for the correction of astigmatism and coma because the faces of the positive meniscus lens L21, with a convex directed to the image side, are positioned concentrically with respect to the position of said diaphragm.

In the following explained are the conditions (1) to (5) of the zoom lens of the present invention.

The condition (1) defines the appropriate optical path length when the light, entering the biconcave lens component L12 of the first lens group G1, passes through the biconvex lens component L13 and the positive lens component L14. In a two-group zoom lens with positive and negative lens groups, the diaphragm is generally positioned at the image side of the first lens group G1. In the zoom lens of the present invention, a negative distortion aberration is generated in the object side face, distanct from the diaphragm, of the biconcave lens component L12 of the first lens group, in order to correct the aforementioned distortion aberration. Thus, said negative distortion aberration increases when the optical distance, or optical path length, of said face from the diaphragm increases. Consequently the condition (1) defines the appropriate optical path length. An area above the upper limit of said condition (1) is undesirable as the first lens group G1 becomes large to increase the dimension of the entire lens system. On the other hand, below the lower limit of said condition (1), it becomes difficult to satisfactorily correct the positive distortion aberration generated in the second lens group G2.

The condition (2) defines the optimum shape of the positive meniscus lens component L21, with convex faces directed to the image side, in the second group. Outside the upper and lower limits, the correction of spherical aberration becomes difficult.

When the distance between the positive meniscus lens component L21 and the negative meniscus lens component L22 constituting the second lens group G2 is increased, a parallel light beam from infinite distance, entering the positive meniscus lens component L21 is subjected to the converging action thereof, thus reducing the beam diameter entering the negative meniscus lens component L22. Since the diverging function of said negative meniscus lens component L22 on siad light lbeam becomes weaker, it is possible to reduce the positive spherical aberration generated in the negative meniscus lens component L22. Thus the condition (3) defines the appropriate air gap between the positive meniscus lens component L21 and the negative meniscus lens component L22 in the second lens group. Above the upepr limit of said condition (3), the second lens group G2 becomes larger, and a high zoom ratio cannot be obtained, since it becomes difficult to maintain an appropriate distance between the first lens group G1 and the second lens group G2. It also becomes difficult to secure a sufficiently large back-focus distance at the wide angle side. On the other hand, below the lower limit of said condition, the spherical aberration is excessively corrected.

The condition (4) defines the optimum shape of the negative meniscus lens L22, in the second lens group, with concave faces directed to the object side. Outside the upper and lower limits of said condition (4), the spherical aberration and the distortion aberration become difficult to correct.

The condition (5) defines the appropriate difference in refractive indexes of the positive meniscus lens component L21 and the negative meniscus lens component L22 in the second lens group. Above the upper limit of said condition (5), the Petzvar's sum increases negatively whereby the curvature of image plane becomes difficult to correct. On the other hand, below the lower limit of said condition, the positive meniscus lens component L21 of the second lens group generates an undesirably large coma aberrration.

In the two-group zoom lens with positive and negative groups such as the zoom lens of the present invention, the distance between the first and second lens groups G1, G2 is largest while the back-focus distance is shortest at the wide angle end, and vice versa at the telephoto end. Thus, in such zoom lens, once the focal lengths of the first and second lens groups are respectively determined, the focal length of the entire system at the telephoto end can be determined within a range not causing mechanical interference of the lens groups. In such structure, the distance between the first and second lens groups has to made larger in order to extend the zoom ratio at the telephotoside. However, if said distance is selected large, it becomes difficult to secure a sufficient back-focus distance at the wide angle end.

Consequently, in the zoom lens of the present invention, the power of the positive lens component L14 is selected larger than the synthesized power of three lens components L11–L13 positioned at the object side of the first-mentioned lens component L14, whereby the rear principal point of the first lens group G1 is positioned closer to the image and a sufficiently large distance is secured between the first and second lens groups. It is therefore rendered possible to satisfactorily extend the zoom ratio at the telphoto side and to secure a sufficiently large back-focus distance at the wide angle end.

For securely achieving these results, there is preferred a structure satisfying an additional condition:

$$0.7 < f_{L14}/f_1 < 1.30 \quad (6)$$

wherein:
$f_{L14}$: focal length of positive lens component L14 positioned closest to the image in the first lens group G1; and
$f_1$: focal length of the first lens group G1.

Above the upper limit of the condition (6), the distance between the first and second lens groups becomes smaller, whereby it becomes difficult to extend the zoom ratio at the telephotoside. On the other hand, below the lower limit, the refractive power of the positive lens component L14 increases, whereby the spherical aberration becomes difficult to correct.

Also in the zoom lens of the present invention, the second lens group G2 has a two-lens structure composed of a positive lens component and a negative lens component, thereby enabling satisfactory correction of the spherical aberration and the chromatic aberration from the wide angle end to the telephoto end and also enabling inexpensive manufacture. Also in order to prevent ghost image resulting from the reflection between the lens face closest to the image and the film surface, positive and negative lens components are arranged in succession from the object side in the second lens group G2. Consequently the zoom lens of the present invention can secure a sufficiently large back-focus distance at the wide angle end.

In the above-mentioned zoom lens, the focusing operation can be achieved by the movement of the first lens group G1 toward the object, and the focusing mechanism can thus be simplified. However the focusing may also be achieved for example by dividing the positive lens component L14, closest to the image side, of the first lens group into two portions, and moving the portion at the object side toward the object, instead of moving the entire lens group G1. Such focusing method allows to minimize the variation in the astigmatism, thereby realizing better focusing at a shorter distance.

In such case, there is preferred a structure satisfying a condition:

$$3 < f_b/f_a \quad (7)$$

wherein:
$f_a$: focal length of a positive lens $La$ positioned at the object side in the positive lens component L14; and
$f_b$: focal length of a positive lens $Lb$ positioned at the image side in the positive lens component L14.

Said condition (7) defines the appropriate power distribution in the divided lenses. Outside said range, the curvature of image plane becomes excessively large in the focusing at a short distance.

DETAILED DESCRIPTION OF THE PREFERRED EMBODIMENTS

Now the zoom lens of the present invention will be clarified in detail by 1st to 9th embodiment thereof respectively shown in FIGS. 1 to 9, wherein the zoom lens comprises a first lens group G1 and a second lens group G2, in which said first lens group G1 comprises a positive meniscus lens component L11, a biconcave lens component L12, a biconvex lens component L13 and a positive lens component L14, while said second lens group G2 comprises a positive meniscus lens component L21 and a negative meniscus lens component L22.

The 1st to 6th embodiments shown in FIGS. 1 to 6 have a similar lens structure. In the 1st and 6th embodiments, the biconvex lens L13 in the first lens group is composed of a thick lens. In the 2nd to 5th embodiments, the biconcave lens L12 in the first lens group is composied of a thick lens.

Figure 1:
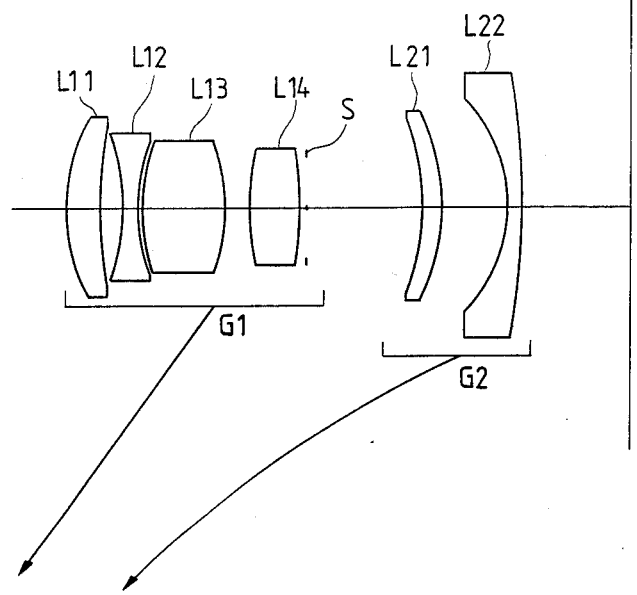
FIG. 1 is a view of the lens structure of a first embodiment of the present invention.
Figure 2:
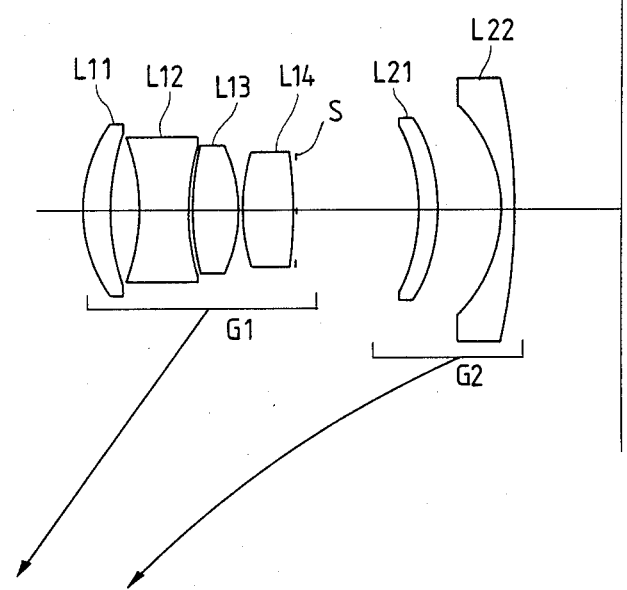
FIG. 2 is a view of the lens structure of a second embodiment.
Figure 3:
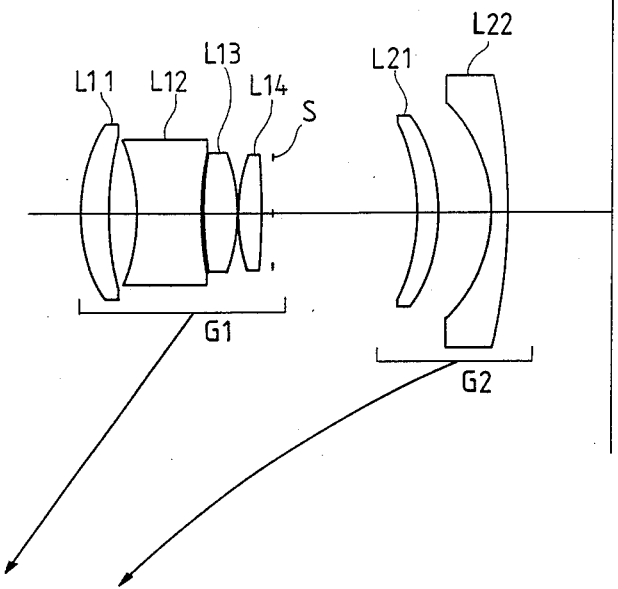
FIG. 3 is a view of the lens structure of a third embodifment.
Figure 4:
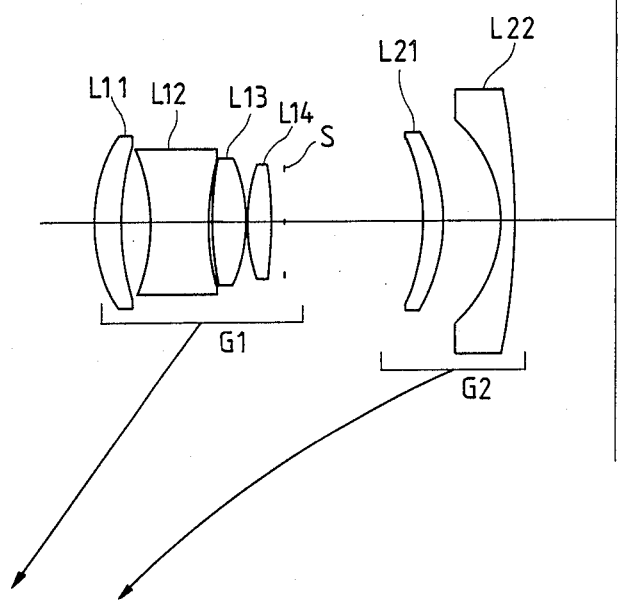
FIG. 4 is a view of the lens structure of a fourth embodiment.
Figure 5:
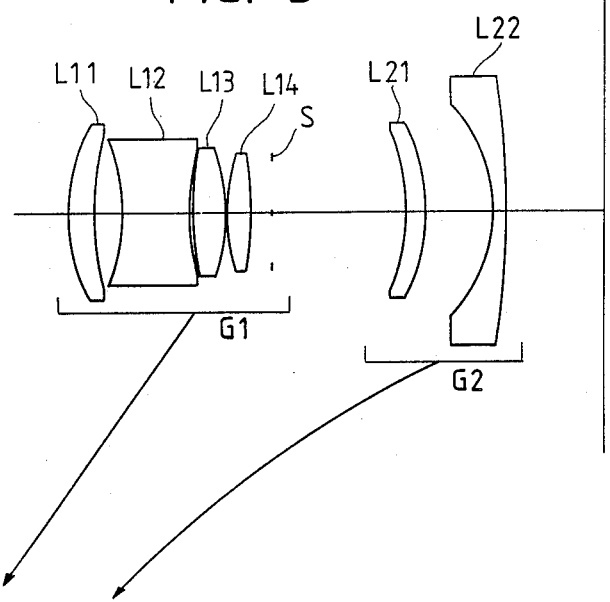
FIG. 5 is a view of the lens structure of a fifth embodiment.
Figure 6:
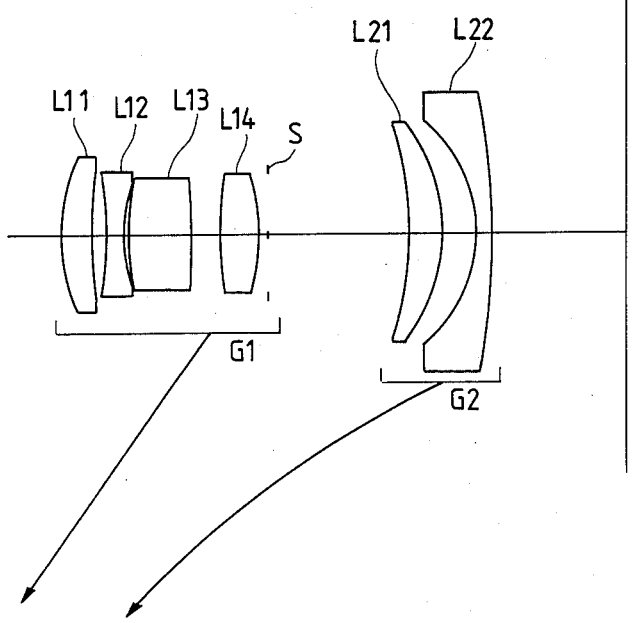
FIG. 6 is a view of the lens structure of a sixth embodiment.
Figure 7:
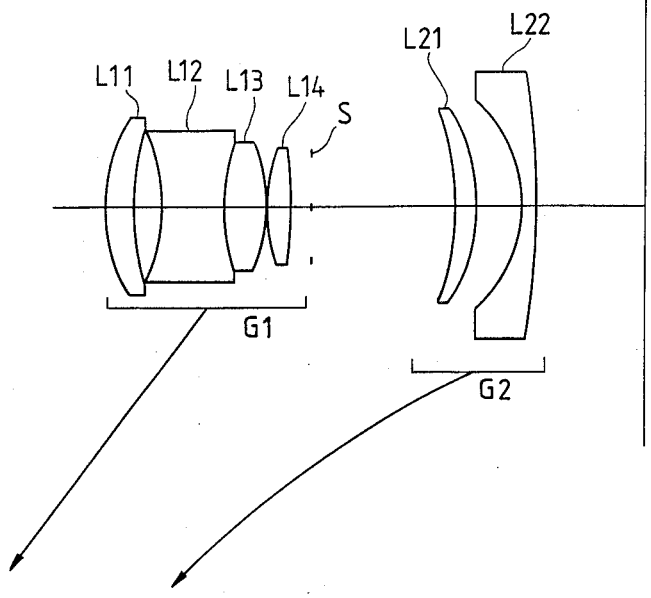
FIG. 7 is a view of the lens structure of a seventh embodiment.
Figure 8:
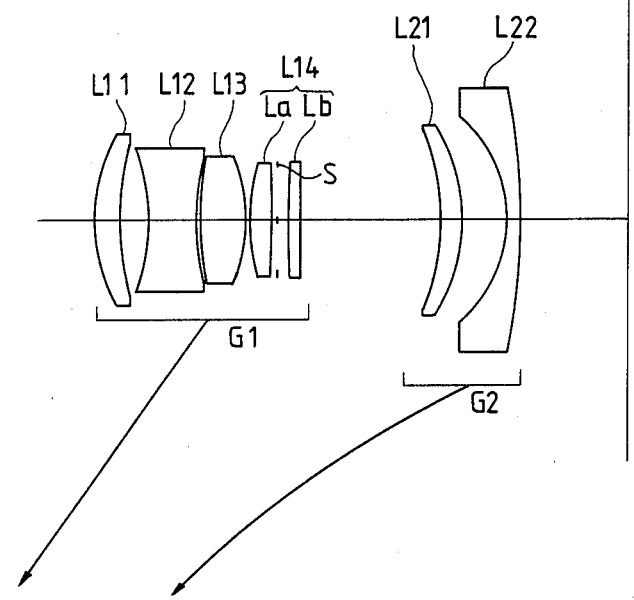
FIG. 8 is a view of the lens structure of an eighth embodiment.
Figure 9:
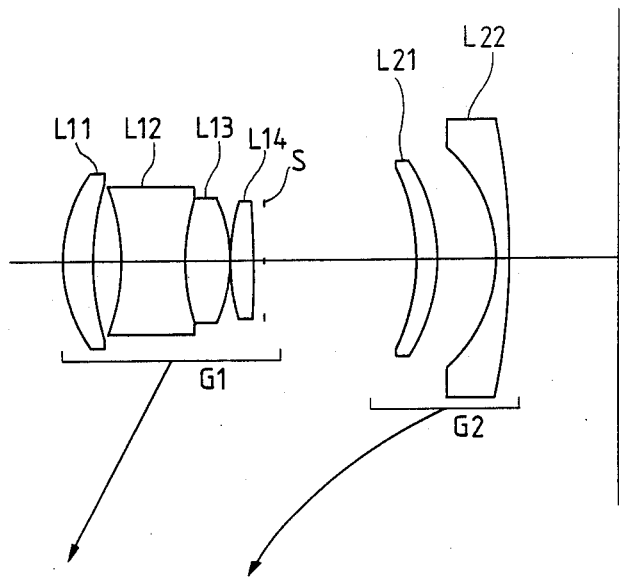
FIG. 9 is a view of the lens structure of a ninth embodiment.

In the 7th embodiment shown in FIG. 7, the biconcave lens L12 and the biconvex lens L13 are adhered together. In the 8th embodiment shown in FIG. 8, the positive lens L14 in the first lens group is divided into a positive lens $La$ and another positive lens $Lb$. In the 9th embodiment shown in FIG. 9, the biconcave lens L12 and the biconvex lens L13 are adhered together.

The zooming operation in said embodiments is conducted, as indicated by arrows in the drawings, from the wide angle end to the telephoto end, by movements of the first lens group G1 and the second lens group G2 toward the object side with gradually decreasing distance therebetween.

The parameters of the above-mentioned embodiments are shown in Tabs. 1 to 9, in which the numbers at left indicate the sequential order of lens faces from the object side; wherein:
r: radius of curvature of lens face;
d: distance of lens faces;
n: refractive index for d-line ($\lambda = 587.6$ nm);
$\nu$: Abbe's number for d-line ($\lambda = 587.6$ nm);
$2\omega$: imaging angle.

TABLE 1

(1st embodiment)
f: 36.0–68.8, F-number: 4.1–7.6
$2\omega$: 61.0–35.1°

|   | r | d | $\nu$ | n |
|---|---|---|---|---|
| 1 | 16.372 | 3.00 | 60.7 | 1.56384 |
| 2 | 37.477 | 2.00 | | |
| 3 | −20.721 | 1.50 | 39.6 | 1.80454 |
| 4 | 16.348 | 0.45 | | |
| 5 | 18.352 | 7.55 | 60.3 | 1.51835 |
| 6 | −16.096 | 2.20 | | |
| 7 | 23.475 | 4.50 | 54.6 | 1.51454 |
| 8 | −40.863 | (variable) | | |
| 9 | −22.036 | 1.90 | 25.5 | 1.80458 |
| 10 | −17.207 | 5.77 | | |
| 11 | −13.148 | 1.30 | 35.7 | 1.90265 |
| 12 | −67.882 | (Bf) | | |
| f | 36.0006 | 50.0013 | 68.8022 | |
| d8 | 11.3199 | 6.4937 | 3.1026 | |

TABLE 1-continued (1st embodiment)

f: 36.0–68.8, F-number: 4.1–7.6

2ω: 61.0–35.1°

|    | r      | d       | ν       | n |
|----|--------|---------|---------|---|
| Bf | 9.8700 | 23.2300 | 41.1707 |   |

TABLE 2

(2nd embodiment)

f: 36.0–68.0, F-number: 4.1–7.5

2ω: 61.0–35.6°

|     | r        | d          | ν       | n       |
|-----|----------|------------|---------|---------|
| 1   | 14.139   | 2.50       | 69.9    | 1.51860 |
| 2   | 25.439   | 2.50       |         |         |
| 3   | −17.871  | 4.50       | 33.9    | 1.80384 |
| 4   | 21.446   | 0.40       |         |         |
| 5   | 26.319   | 4.00       | 49.0    | 1.53172 |
| 6   | −14.601  | 0.50       |         |         |
| 7   | 20.589   | 4.50       | 45.9    | 1.54814 |
| 8   | −56.295  | (variable) |         |         |
| 9   | −17.775  | 1.90       | 25.8    | 1.78472 |
| 10  | −14.986  | 5.80       |         |         |
| 11  | −12.810  | 1.30       | 35.7    | 1.90265 |
| 12  | −46.351  | (Bf)       |         |         |
| f   | 36.0007  | 50.0002    | 68.0003 |         |
| d8  | 11.5569  | 6.3876     | 2.8688  |         |
| Bf  | 9.5907   | 23.6029    | 41.6193 |         |

TABLE 3

(3rd embodiment)

f: 36.1–68.1, F-number: 4.1–7.5

2ω: 60.6–35.5°

|     | r        | d          | ν       | n       |
|-----|----------|------------|---------|---------|
| 1   | 14.870   | 2.50       | 69.9    | 1.51860 |
| 2   | 27.442   | 2.50       |         |         |
| 3   | −17.471  | 6.00       | 40.9    | 1.79631 |
| 4   | 27.982   | 0.30       |         |         |
| 5   | 45.246   | 3.00       | 69.9    | 1.51860 |
| 6   | −14.504  | 0.20       |         |         |
| 7   | 19.187   | 2.00       | 54.6    | 1.51454 |
| 8   | −50.673  | (variable) |         |         |
| 9   | −18.644  | 1.90       | 25.5    | 1.80458 |
| 10  | −15.153  | 5.00       |         |         |
| 11  | −12.749  | 1.30       | 40.9    | 1.79631 |
| 12  | −56.845  | (Bf)       |         |         |
| f   | 36.0672  | 49.9999    | 68.0792 |         |
| d8  | 14.2920  | 8.3620     | 4.2854  |         |
| Bf  | 9.5060   | 24.4895    | 43.9323 |         |

TABLE 4

(4th embodiment)

f: 36.0–68.0, F-number: 4.1–7.5

2ω: 60.1–35.5°

|     | r        | d          | ν       | n       |
|-----|----------|------------|---------|---------|
| 1   | 14.564   | 2.50       | 59.0    | 1.51823 |
| 2   | 27.044   | 2.50       |         |         |
| 3   | −17.273  | 5.50       | 39.6    | 1.80454 |
| 4   | 27.373   | 0.25       |         |         |
| 5   | 41.082   | 3.00       | 60.3    | 1.51835 |
| 6   | −14.174  | 0.20       |         |         |
| 7   | 19.085   | 2.00       | 64.1    | 1.51680 |
| 8   | −52.653  | (variable) |         |         |
| 9   | −17.928  | 1.90       | 33.9    | 1.80384 |
| 10  | −14.698  | 5.00       |         |         |
| 11  | −12.286  | 1.30       | 52.3    | 1.74810 |
| 12  | −60.199  | (Bf)       |         |         |
| f   | 36.0006  | 50.0008    | 68.0007 |         |
| d8  | 14.0178  | 8.0638     | 4.0111  |         |
| Bf  | 9.4214   | 24.4674    | 43.8121 |         |

TABLE 5

(5th embodiment)

f: 36.0–68.0, F-number: 4.1–7.5

2ω: 60.1–35.4°

|     | r        | d          | ν       | n       |
|-----|----------|------------|---------|---------|
| 1   | 15.632   | 2.50       | 64.1    | 1.51680 |
| 2   | 29.556   | 2.50       |         |         |
| 3   | −17.066  | 6.30       | 40.9    | 1.79631 |
| 4   | 25.246   | 0.30       |         |         |
| 5   | 31.544   | 3.00       | 69.9    | 1.51860 |
| 6   | −14.845  | 0.20       |         |         |
| 7   | 20.696   | 2.00       | 54.6    | 1.51454 |
| 8   | −43.209  | (variable) |         |         |
| 9   | −19.192  | 1.90       | 27.6    | 1.74077 |
| 10  | −15.925  | 6.00       |         |         |
| 11  | −13.265  | 1.30       | 46.5    | 1.80411 |
| 12  | −66.996  | (Bf)       |         |         |
| f   | 36.0072  | 50.0000    | 67.9987 |         |
| d8  | 14.2159  | 8.6809     | 4.9109  |         |
| Bf  | 8.8173   | 22.8068    | 40.8013 |         |

TABLE 6

(6th embodiment)

f: 38.8–58.8, F-number: 4.0–6.0

2ω: 57.3–40.9°

|     | r        | d          | ν       | n       |
|-----|----------|------------|---------|---------|
| 1   | 16.868   | 2.80       | 47.1    | 1.67003 |
| 2   | 48.371   | 1.30       |         |         |
| 3   | −34.269  | 1.70       | 38.0    | 1.72342 |
| 4   | 15.684   | 0.50       |         |         |
| 5   | 33.614   | 5.45       | 60.3    | 1.62041 |
| 6   | −115.527 | 2.70       |         |         |
| 7   | 35.897   | 3.40       | 58.5    | 1.65160 |
| 8   | −22.975  | (variable) |         |         |
| 9   | −29.506  | 2.90       | 31.7    | 1.75692 |
| 10  | −16.357  | 2.95       |         |         |
| 11  | −13.182  | 1.50       | 37.2    | 1.83400 |
| 12  | −69.316  | (Bf)       |         |         |
| f   | 38.8002  | 45.0002    | 58.8000 |         |
| d8  | 14.0398  | 10.2296    | 4.6335  |         |
| Bf  | 12.2169  | 20.1273    | 37.7341 |         |

TABLE 7

(7th embodiment)

f: 36.0–68.0, F-number: 4.1–7.5

2ω: 60.2–35.6°

|     | r        | d          | ν       | n       |
|-----|----------|------------|---------|---------|
| 1   | 15.283   | 2.50       | 57.0    | 1.62280 |
| 2   | 23.015   | 2.50       |         |         |
| 3   | −17.507  | 6.00       | 39.6    | 1.80454 |
| 4   | 18.125   | 3.80       | 54.6    | 1.51454 |
| 5   | −14.547  | 0.20       |         |         |
| 6   | 18.547   | 2.00       | 64.1    | 1.51680 |
| 7   | −53.257  | (variable) |         |         |
| 8   | −22.375  | 1.90       | 25.5    | 1.80458 |
| 9   | −15.874  | 4.00       |         |         |
| 10  | −12.436  | 1.30       | 40.9    | 1.79631 |
| 11  | −74.835  | (Bf)       |         |         |
| f   | 36.0007  | 50.0009    | 68.0011 |         |
| d7  | 15.1131  | 9.1591     | 5.1064  |         |
| Bf  | 9.8849   | 24.9310    | 44.2758 |         |

TABLE 8

(8th embodiment)

f: 36.0–68.0, F-number: 4.1–7.5

2ω: 60.1–35.6°

|     | r        | d          | ν       | n       |
|-----|----------|------------|---------|---------|
| 1   | 15.021   | 2.50       | 69.9    | 1.51860 |
| 2   | 28.267   | 2.50       |         |         |
| 3   | −18.935  | 4.50       | 39.6    | 1.80454 |
| 4   | 29.135   | 0.40       |         |         |
| 5   | 43.318   | 4.00       | 54.6    | 1.51454 |
| 6   | −15.806  | 0.50       |         |         |

TABLE 8-continued (8th embodiment)
f: 36.0–68.0, F-number: 4.1–7.5,
2ω: 60.1–35.6°

| | r | d | ν | n |
|---|---|---|---|---|
| 7 | 21.293 | 2.00 | 69.9 | 1.51860 |
| 8 | −79.469 | 1.41 | | |
| 9 | 119.060 | 1.20 | 64.1 | 1.51680 |
| 10 | −322.377 | (variable) | | |
| 11 | −20.493 | 1.90 | 33.9 | 1.80384 |
| 12 | −15.110 | 4.00 | | |
| 13 | −12.120 | 1.30 | 44.7 | 1.80218 |
| 14 | −59.650 | (Bf) | | |
| f | 36.0006 | 50.0007 | 68.0012 | |
| d10 | 12.8795 | 6.9255 | 2.8727 | |
| Bf | 9.6744 | 24.7203 | 44.0655 | |

TABLE 9

(9th embodiment)
f: 36.1–68.1, F-number: 4.1–7.5,
2ω: 60.6–35.5°

| | r | d | ν | n |
|---|---|---|---|---|
| 1 | 13.892 | 2.50 | 69.9 | 1.51860 |
| 2 | 22.716 | 2.50 | | |
| 3 | −17.043 | 5.50 | 40.9 | 1.79631 |
| 4 | 18.350 | 3.80 | 60.3 | 1.51835 |
| 5 | −13.767 | 0.20 | | |
| 6 | 20.018 | 2.00 | 54.0 | 1.61720 |
| 7 | −149.137 | (variable) | | |
| 8 | −18.644 | 1.90 | 25.5 | 1.80458 |
| 9 | −15.153 | 5.00 | | |
| 10 | −12.749 | 1.30 | 40.9 | 1.79631 |
| 11 | −56.845 | (Bf) | | |
| F | 36.0696 | 49.9990 | 68.0808 | |
| d7 | 14.2920 | 8.3630 | 4.2854 | |
| Bf | 9.5042 | 24.4825 | 43.9258 | |

Conditions of the foregoing embodiments are sumamrized in Tab. 10:

TABLE 10

(Comparisons of conditions)

| No. | $K/f_w$ | Q | $D_{21}/f_w$ | R | $n_{21}-n_{22}$ | $f_{L14}/f_1$ | $f_b/f_a$ |
|---|---|---|---|---|---|---|---|
| 1 | 0.66 | −8.1 | 0.160 | 1.48 | −0.098 | 1.16 | |
| 2 | 0.61 | −11.7 | 0.161 | 1.76 | −0.118 | 1.09 | |
| 3 | 0.52 | −9.7 | 0.139 | 1.58 | 0.008 | 1.02 | |
| 4 | 0.50 | −10.1 | 0.139 | 1.51 | 0.056 | 1.03 | |
| 5 | 0.54 | −10.7 | 0.167 | 1.49 | −0.063 | 1.03 | |
| 6 | 0.53 | −3.5 | 0.076 | 1.47 | −0.077 | 0.76 | |
| 7 | 0.55 | −5.9 | 0.111 | 1.40 | 0.008 | 1.01 | |
| 8 | 0.59 | −6.6 | 0.111 | 1.51 | 0.002 | 1.04 | 5.17 |
| 9 | 0.53 | −9.7 | 0.139 | 1.58 | 0.008 | 1.08 | | wherein:
$$Q = \frac{r_b + r_a}{r_b - r_a}, \quad R = \frac{r_d + r_c}{r_d - r_c}$$

The diaphragm S in the 1st to 7th and 9th embodiments is positioned in the air gap between the first lens group G1 and the second lens group G2. The faces of the positive meniscus lens L21, positioned closest to the object, in the second lens group are concave to said diaphragm and convex to the image, and are therefore advantageous in correcting the astigmatism and coma aberrations. In these embodiments, the focusing operation is conducted by moving the first lens group G1, positioned at the object side with respect to said diaphragm S, toward the object side.

On the other hand, in the 8th embodiment, the diaphragm S is positioned in a split gap obtained by dividing the positive lens L14 of the first lens group G1, and the focusing in said embodiment is conducted by moving the lens, positioned at the object side with respect to said diaphragm, toward the object side. Also this embodiment satisfactorily reduces the variation in astigmatic aberration in the focusing at a short distance, thereby achieving high focusing performance.

Thus the foregoing embodiments provide a compact zoom lens which has a relatively large zoom ratio and excellent focusing performance from the wide angle end to the telephoto end while maintaining an inexpensive compact structure with a limited number of lenses.

What is claimed is:

1. A compact zoom lens provided with a first lens group G1 of a positive refractive power and a second lens group G2 of a negative refractive power and adapted for performing a zooming operation by varying the air gap between said lens groups;

wherein said first lens group G1 comprises, in the order from the object side, a positive meniscus lens component L11 with faces convex to the object side, a biconcave lens component L12, a biconvex lens component L13, and a positive lens component L14;

said second lens group G2 comprises, in the order from the object side, a positive meniscus lens component L21 with faces convex to the image side, and a negative meniscus lens component L22 with faces concave to the object side; and said lens components L11, L12, L13, L14, L21 and L22 satisfy following conditions (1) to (5);

$$0.49 < K/f_w < 0.7 \quad (1)$$

$$-12 < \frac{r_b + r_a}{r_b - r_a} < -3.4 \quad (2)$$

$$0.075 < D_{21}/f_w < 0.170 \quad (3)$$

$$1.25 < \frac{r_d + r_c}{r_d - r_c} < 1.80 \quad (4)$$

$$-0.13 < n_{21} - n_{22} < 0.06 \quad (5)$$

wherein

K: $d_{12} \cdot n_{12} + d_{13} \cdot n_{13} + d_{14} + D_{12} + D_{13}$ $d_{12}$: axial thickness of biconcave lens component $L_{12}$;

$d_{13}$: axial thickness of biconvex lens component $L_{13}$;

$d_{14}$: axial thickness of positive lens component $L_{14}$;

$n_{12}$: refractive index of biconcave lens component $L_{12}$;

$n_{13}$: refractive index of biconvex lens component $L_{13}$;

$n_{14}$: refractive index of positive lens component $L_{14}$;

$D_{12}$: axial air gap between biconcave lens component $L_{12}$ and biconvex lens component $L_{13}$;

$D_{13}$: axial air gap between biconvex lens component $L_{13}$ and positive lens component $L_{14}$;

$f_w$: focal length of entire system at wide angle end;

$r_a$: radius of curvature of the face, closest to the object, of the positive meniscus lens component $L_{21}$ of the second lens group;

$r_b$: radius of curvature of the face, closest to the image, of positive meniscus lens component $L_{21}$ in the second lens group;

$D_{21}$: axial air gap between positive meniscus lens component $L_{21}$ and negative meniscus lens component $L_{22}$ in the second lens group;

$r_c$: radius of curvature of the face, closest to the object, of negative meniscus lens component $L_{22}$ of the second lens group;

$r_d$: radius of curvature of the face, closest to the image, of negative meniscus lens component $L_{22}$ of the second lens group;

$n_{21}$: refractive index of positive meniscus lens component $L_{21}$ of the second lens group; and $n_{22}$: refractive index of negative meniscus lens component $L_{22}$ of the second lens group.

2. A compact zoom lens according to claim 1, wherein said first lens group G1 satisfies following condition (6):

$$0.7 < f_{L14}/f_1 < 1.30 \quad (6)$$

wherein $f_{L14}$: focal length of positive lens component $L_{14}$; and $f_1$: focal length of the first lens group G1.

3. A compact zoom lens according to claim 1, wherein said biconcave lens component $L_{12}$ and said biconvex lens component $L_{13}$ are mutually adhered.

4. A compact zoom lens according to claim 2, wherein said biconcave lens component $L_{12}$ and said biconvex lens component $L_{13}$ are mutually adhered.

5. A compact zoom lens according to claim 1, wherein said positive lens component $L_{14}$ satisfies following condition (7):

$$3 < f_b/f_a \quad (7)$$

wherein:

$f_a$: focal length of the positive lens $L_a$, positioned at the object side, of the positive lens component $L_{14}$; and $f_b$: focal length of the positive lens $L_b$, psoitioned at the image side, of the positive lens component $L_{14}$.

6. A compact zoom lens according to claim 2, wherein said positive lens component $L_{14}$ satisfies following condition (7):

$$3 < f_b/f_a \quad (7)$$

wherein:

$f_a$: focal length of the positive lens $L_a$, positioned at the object side, of the positive lens component $L_{14}$; and $f_b$: focal length of the positive lens $L_b$, positioned at the image side, of the positive lens component $L_{14}$.

7. A compact zoom lens according to claim 1, comprising following specifications and data;
focal length f=36.0–68.8
F-number=4.1–7.6
$2\omega$=61.0–35.1°

| No. | Radius of Curvature r | Central Thickness Spacing d | Abbe's Number $\nu$ | Refractive Index n | |
|---|---|---|---|---|---|
| 1 | 16.372 | 3.00 | 60.7 | 1.56384 | G1 |
| 2 | 37.477 | 2.00 | | | |
| 3 | −20.721 | 1.50 | 39.6 | 1.80454 | |
| 4 | 16.348 | 0.45 | | | |
| 5 | 18.352 | 7.55 | 60.3 | 1.51835 | |
| 6 | −16.096 | 2.20 | | | |
| 7 | 23.475 | 4.50 | 54.6 | 1.51454 | |
| 8 | −40.863 | (d8) | | | |
| 9 | −22.036 | 1.90 | 25.5 | 1.80458 | G2 |
| 10 | −17.207 | 5.77 | | | |
| 11 | −13.148 | 1.30 | 35.7 | 1.90265 | |
| 12 | −67.882 | (Bf) | | | |

-continued

| No. | Radius of Curvature r | Central Thickness Spacing d | Abbe's Number $\nu$ | Refractive Index n |
|---|---|---|---|---|
| f | 36.0006 | 50.0013 | 68.8022 | |
| d8 | 11.3199 | 6.4937 | 3.1026 | |
| Bf | 9.8700 | 23.2300 | 41.1707 | |

8. A compact zoom lens according to claim 1, comprising following specifications and data:
focal length f=36.0–68.0
F-number=4.1–7.5
$2\omega$=61.0–35.6°

| No. | Radius of Curvature r | Central Thickness Spacing d | Abbe's Number $\nu$ | Refractive Index n | |
|---|---|---|---|---|---|
| 1 | 14.139 | 2.50 | 69.9 | 1.51860 | G1 |
| 2 | 25.439 | 2.50 | | | |
| 3 | −17.871 | 4.50 | 33.9 | 1.80384 | |
| 4 | 21.446 | 0.40 | | | |
| 5 | 26.319 | 4.00 | 49.0 | 1.53172 | |
| 6 | −14.601 | 0.50 | | | |
| 7 | 20.589 | 4.50 | 45.9 | 1.54814 | |
| 8 | −56.295 | (d8) | | | |
| 9 | −17.775 | 1.90 | 25.8 | 1.78472 | G2 |
| 10 | −14.986 | 5.80 | | | |
| 11 | −12.810 | 1.30 | 35.7 | 1.90265 | |
| 12 | −46.351 | (Bf) | | | |
| f | 36.0007 | 50.0002 | 68.0003 | | |
| d8 | 11.5569 | 6.3876 | 2.8688 | | |
| Bf | 9.5907 | 23.6029 | 41.6193 | | |

9. A compact zoom lens according to claim 1, comprising following specifications and data:
focal length f=36.1–68.1
F-number=4.1–7.5
$2\omega$=60.6–35.5°

| No. | Radius of Curvature r | Central Thickness Spacing d | Abbe's Number $\nu$ | Refractive Index n | |
|---|---|---|---|---|---|
| 1 | 14.870 | 2.50 | 69.9 | 1.51860 | G1 |
| 2 | 27.442 | 2.50 | | | |
| 3 | −17.471 | 6.00 | 40.9 | 1.79631 | |
| 4 | 27.982 | 0.30 | | | |
| 5 | 45.246 | 3.00 | 69.9 | 1.51860 | |
| 6 | −14.504 | 0.20 | | | |
| 7 | 19.187 | 2.00 | 54.6 | 1.51454 | |
| 8 | −50.673 | (d8) | | | |
| 9 | −18.644 | 1.90 | 25.5 | 1.80458 | G2 |
| 10 | −15.153 | 5.00 | | | |
| 11 | −12.749 | 1.30 | 40.9 | 1.79631 | |
| 12 | −56.845 | (Bf) | | | |
| f | 36.0672 | 49.9999 | 68.0792 | | |
| d8 | 14.2920 | 8.3620 | 4.2854 | | |
| Bf | 9.5060 | 24.4895 | 43.9323 | | |

10. A compact zoom lens according to claim 1, comprising following specifications and data:
focal length f=36.0–68.0
F-number=4.1–7.5
$2\omega$=60.1–35.5°

| No. | Radius of Curvature r | Central Thickness Spacing d | Abbe's Number $\nu$ | Refractive Index n | |
|---|---|---|---|---|---|
| 1 | 14.564 | 2.50 | 59.0 | 1.51823 | G1 |
| 2 | 27.044 | 2.50 | | | |
| 3 | −17.273 | 5.50 | 39.6 | 1.80454 | |
| 4 | 27.373 | 0.25 | | | |

-continued

| No. | Radius of Curvature r | Central Thickness Spacing d | Abbe's Number ν | Refractive Index n | |
|---|---|---|---|---|---|
| 5 | 41.082 | 3.00 | 60.3 | 1.51835 | |
| 6 | −14.174 | 0.20 | | | |
| 7 | 19.085 | 2.00 | 64.1 | 1.51680 | |
| 8 | −52.653 | (d8) | | | |
| 9 | −17.928 | 1.90 | 33.9 | 1.80384 | G2 |
| 10 | −14.698 | 5.00 | | | |
| 11 | −12.286 | 1.30 | 52.3 | 1.74810 | |
| 12 | −60.199 | (Bf) | | | |
| f | 36.0006 | 50.0008 | 68.0007 | | |
| d8 | 14.0178 | 8.0638 | 4.0111 | | |
| Bf | 9.4214 | 24.4674 | 43.8121 | | |

11. A compact zoom lens according to claim 1, comprising following specifications and data:
focal length f=36.0–68.0
F-number=4.1–7.5
2ω=60.1–35.4°

| No. | Radius of Curvature r | Central Thickness Spacing d | Abbe's Number ν | Refractive Index n | |
|---|---|---|---|---|---|
| 1 | 15.632 | 2.50 | 64.1 | 1.51680 | G1 |
| 2 | 29.556 | 2.50 | | | |
| 3 | −17.066 | 6.30 | 40.9 | 1.79631 | |
| 4 | 25.246 | 0.30 | | | |
| 5 | 31.544 | 3.00 | 69.9 | 1.51860 | |
| 6 | −14.845 | 0.20 | | | |
| 7 | 20.696 | 2.00 | 54.6 | 1.51454 | |
| 8 | −43.209 | (d8) | | | |
| 9 | −19.192 | 1.90 | 27.6 | 1.74077 | G2 |
| 10 | −15.925 | 6.00 | | | |
| 11 | −13.265 | 1.30 | 46.5 | 1.80411 | |
| 12 | −66.996 | (Bf) | | | |
| f | 36.0072 | 50.0000 | 67.9987 | | |
| d8 | 14.2159 | 8.6809 | 4.9109 | | |
| Bf | 8.8173 | 22.8068 | 40.8013 | | |

12. A compact zoom lens according to claim 1, comprising following specifications and data:
focal length f=38.8–58.8
F-number=4.0–6.0
2ω=57.3–40.9°

| No. | Radius of Curvature r | Central Thickness Spacing d | Abbe's Number ν | Refractive Index n | |
|---|---|---|---|---|---|
| 1 | 16.868 | 2.80 | 47.1 | 1.67003 | G1 |
| 2 | 48.371 | 1.30 | | | |
| 3 | −34.269 | 1.70 | 38.0 | 1.72342 | |
| 4 | 15.684 | 0.50 | | | |
| 5 | 33.614 | 5.45 | 60.3 | 1.62041 | |
| 6 | −115.527 | 2.70 | | | |
| 7 | 35.897 | 3.40 | 58.5 | 1.65160 | |
| 8 | −22.975 | (d8) | | | |
| 9 | −29.506 | 2.90 | 31.7 | 1.75692 | G2 |
| 10 | −16.357 | 2.95 | | | |
| 11 | −13.182 | 1.50 | 37.2 | 1.83400 | |
| 12 | −69.316 | (Bf) | | | |
| f | 38.8002 | 45.0002 | 58.8000 | | |
| d8 | 14.0398 | 10.2296 | 4.6335 | | |
| Bf | 12.2169 | 20.1273 | 37.7341 | | |

13. A compact zoom lens according to claim 1, comprising following specifications and data:
focal length f=36.0–68.0
F-number=4.1–7.5
2ω=60.2–35.6°

| No. | Radius of Curvature r | Central Thickness Spacing d | Abbe's Number ν | Refractive Index n | |
|---|---|---|---|---|---|
| 1 | 15.283 | 2.50 | 57.0 | 1.62280 | G1 |
| 2 | 23.015 | 2.50 | | | |
| 3 | −17.507 | 6.00 | 39.6 | 1.80454 | |
| 4 | 18.125 | 3.80 | 54.6 | 1.51454 | |
| 5 | −14.547 | 0.20 | | | |
| 6 | 18.547 | 2.00 | 64.1 | 1.51680 | |
| 7 | −53.257 | (d7) | | | |
| 8 | −22.375 | 1.90 | 25.5 | 1.80458 | G2 |
| 9 | −15.874 | 4.00 | | | |
| 10 | −12.436 | 1.30 | 40.9 | 1.79631 | |
| 11 | −74.835 | (Bf) | | | |
| f | 36.0007 | 50.0009 | 68.0011 | | |
| d7 | 15.1131 | 9.1591 | 5.1064 | | |
| Bf | 9.8849 | 24.9310 | 44.2758 | | |

14. A compact zoom lens according to claim 1, comprising following specifications and data:
focal length f=36.0–68.0
F-number=4.1–7.5
2ω=60.1–35.6°

| No. | Radius of Curvature r | Central Thickness Spacing d | Abbe's Number ν | Refractive Index n | |
|---|---|---|---|---|---|
| 1 | 15.021 | 2.50 | 69.9 | 1.51860 | G1 |
| 2 | 28.267 | 2.50 | | | |
| 3 | −18.935 | 4.50 | 39.6 | 1.80454 | |
| 4 | 29.135 | 0.40 | | | |
| 5 | 43.318 | 4.00 | 54.6 | 1.51454 | |
| 6 | −15.806 | 0.50 | | | |
| 7 | 21.293 | 2.00 | 69.9 | 1.51860 | |
| 8 | −79.469 | 1.41 | | | |
| 9 | 119.060 | 1.20 | 64.1 | 1.51680 | |
| 10 | −322.377 | (d10) | | | |
| 11 | −20.493 | 1.90 | 33.9 | 1.80384 | G2 |
| 12 | −15.110 | 4.00 | | | |
| 13 | −12.120 | 1.30 | 44.7 | 1.80218 | |
| 14 | −59.650 | (Bf) | | | |
| f | 36.0006 | 50.0007 | 68.0012 | | |
| d10 | 12.8795 | 6.9255 | 2.8727 | | |
| Bf | 9.6744 | 24.7203 | 44.0655 | | |

15. A compact zoom lens according to claim 1, comprising following specifications and data:
focal length f=36.1–68.1
F-number=4.1–7.5
2ω=60.6–35.5°

| No. | Radius of Curvature r | Central Thickness Spacing d | Abbe's Number ν | Refractive Index n | |
|---|---|---|---|---|---|
| 1 | 13.892 | 2.50 | 69.9 | 1.51860 | G1 |
| 2 | 22.716 | 2.50 | | | |
| 3 | −17.043 | 5.50 | 40.9 | 1.79631 | |
| 4 | 18.350 | 3.80 | 60.3 | 1.51835 | G1 |
| 5 | −13.767 | .20 | | | |
| 6 | 20.018 | 2.00 | 54.0 | 1.61720 | |
| 7 | −149.137 | (d7) | | | |
| 8 | −18.644 | 1.90 | 25.5 | 1.80458 | G2 |
| 9 | −15.153 | 5.00 | | | |
| 10 | −12.749 | 1.30 | 40.9 | 1.79631 | |
| 11 | −56.845 | (Bf) | | | |
| F | 36.0696 | 49.9990 | 68.0808 | | |
| d7 | 14.2920 | 8.3630 | 4.2854 | | |
| Bf | 9.5042 | 24.4825 | 43.9258 | | |

* * * * *